April 17, 1956 J. M. BLACKHALL ET AL 2,742,535

AUTOMATIC TELEPHONE SYSTEM

Filed May 15, 1951 5 Sheets-Sheet 1

INVENTORS.
JAMES M. BLACKHALL
MAURICE G. RYON
DONALD S. BAKER
GEORGE P. MARTIN.
BY Brown, Jackson, Boettcher & Dienner
ATTYS.

April 17, 1956 J. M. BLACKHALL ET AL 2,742,535

AUTOMATIC TELEPHONE SYSTEM

Filed May 15, 1951 5 Sheets-Sheet 2

*INVENTORS.*
JAMES M. BLACKHALL
MAURICE G. RYON
DONALD S. BAKER
GEORGE P. MARTIN

*BY* Brown, Jackson, Boettcher & Dienner
ATTYS

AUTOMATIC TELEPHONE SYSTEM

Filed May 15, 1951 5 Sheets-Sheet 3

INVENTORS.
JAMES M. BLACKHALL
MAURICE G. RYON
BY DONALD S. BAKER
GEORGE P. MARTIN
Brown, Jackson, Boettcher & Dienner
ATTYS.

April 17, 1956 J. M. BLACKHALL ET AL 2,742,535

AUTOMATIC TELEPHONE SYSTEM

Filed May 15, 1951 5 Sheets-Sheet 4

INVENTORS.
JAMES M. BLACKHALL
MAURICE G. RYON
DONALD S. BAKER
GEORGE P. MARTIN

BY Brown, Jackson, Boettcher & Dienner

ATTYS.

INVENTORS.
JAMES M. BLACKHALL
MAURICE G. RYON
DONALD S. BAKER
GEORGE P. MARTIN

BY [signature]

ATTYS.

2,742,535

AUTOMATIC TELEPHONE SYSTEM

James M. Blackhall and Maurice G. Ryon, Galion, and Donald S. Baker and George P. Martin, Kenton, Ohio, assignors to North Electric Company, Galion, Ohio, a corporation of Ohio Application May 15, 1951, Serial No. 226,371

18 Claims. (Cl. 179—91)

This invention relates in general to telephone exchange apparatus, and, in particular, to automatic telephone exchange apparatus of the all-relay type.

The inherent simplicity and reliability of telephone equipment of the all-relay type has long been acknowledged by parties skilled in the telephone field, and in smaller independent exchanges there has been a definite preference for the use of such type equipment. The reduced housing requirements, the greater speed of operation, the easy non-destructive movements of the relays in their operation, simplicity in maintenance and the resultant longevity of all-relay equipment are only a few of the features which have rendered that equipment distinguishable over other types of equipment in the field.

While these and other advantages and features are inherent in all-relay type telephone systems of all types and sizes, the comparative inflexibility of the equipment in larger size exchanges and the proportionally excessive number of relays which are required in exchanges of larger sizes placed the all-relay type system at an initial competitive disadvantage with other types of systems. Moreover, the problems and difficulties experienced in the further expansion of established ones of the systems proved to be a further shortcoming and disadvantage.

The aforementioned experienced difficulties were partially attributable to the fixed structural characteristics and the inflexible nature of the circuit interconnections which existed in the all-relay systems known heretofore in the art. That is, because of the fixed nature of the equipment once installed, further modifications thereto as required by changes in traffic loads, growth of the area to be served, etc., meant the addition of further similar equipment and excessive costs would result therefrom.

It is, therefore, a particular object of the present invention to provide an all-relay system which is flexible in its structure, demountable in its arrangement, economical in its manufacture, and which is particularly adapted to overcome these known disadvantages of the previous types of all-relay exchange equipment. It is an ancillary object of the invention to provide an all-relay arrangement which is universal in its application and competitive with the more mechanical type telephone systems in all sizes of exchanges. Other objects of the invention will become apparent from the following description.

As in previous types of all-relay equipment, each telephone exchange is divided into a series of basic hundred line bay units, the number of bays being dependent upon the number of subscriber lines which are necessary to serve the needs of the local community. According to the invention, the relay apparatus of each exchange bay is mounted and arranged on a series of independent strips which are adapted for detachable mounting on the frame structure. A group of new and novel connecting units provide a flexible and positive contact control means for effecting interconnection of the elements on each of the various strips and connection thereof with other equipment in the exchange. The connections accomplished by such means are readily established and interrupted and permit ready disassociation of the individual strips from the equipment.

A particular feature of the invention is the manner in which an improved all-relay type system is provided without sacrifice of quality, of equipment, or of service and without impairment of the inherently superior characteristics of the all relay type exchanges.

In the achievement of a demountable type all-relay exchange, there is set forth herein a novel sectionalized arrangement of the relay units for use with the novel intersection connecting means, whereby dismantling and assembly of strip portion of the equipment is effected with a minimum disturbance of the equipment therein. Further, with the provision of a properly sectioned, demountable relay arrangement the various sectional units are rendered interchangeable from position to position on the same bay of switches, to other bays of switches in the exchange, or even to other exchanges. Thus, the all-relay system lends itself to ease of growth, simplicity of repair and maintenance and substantial reduction of overall equipment costs and permits ready distribution of the equipment to meet changing load conditions. With such arrangement a maximum amount of traffic is conveniently, reliably and satisfactorily served with a minimum amount of equipment.

For a more complete understanding of the nature and scope of the structural members and arrangements thereof in the improved system, reference may now be had to the following detailed description taken in connection with the accompanying drawings in which.

Figure 1:
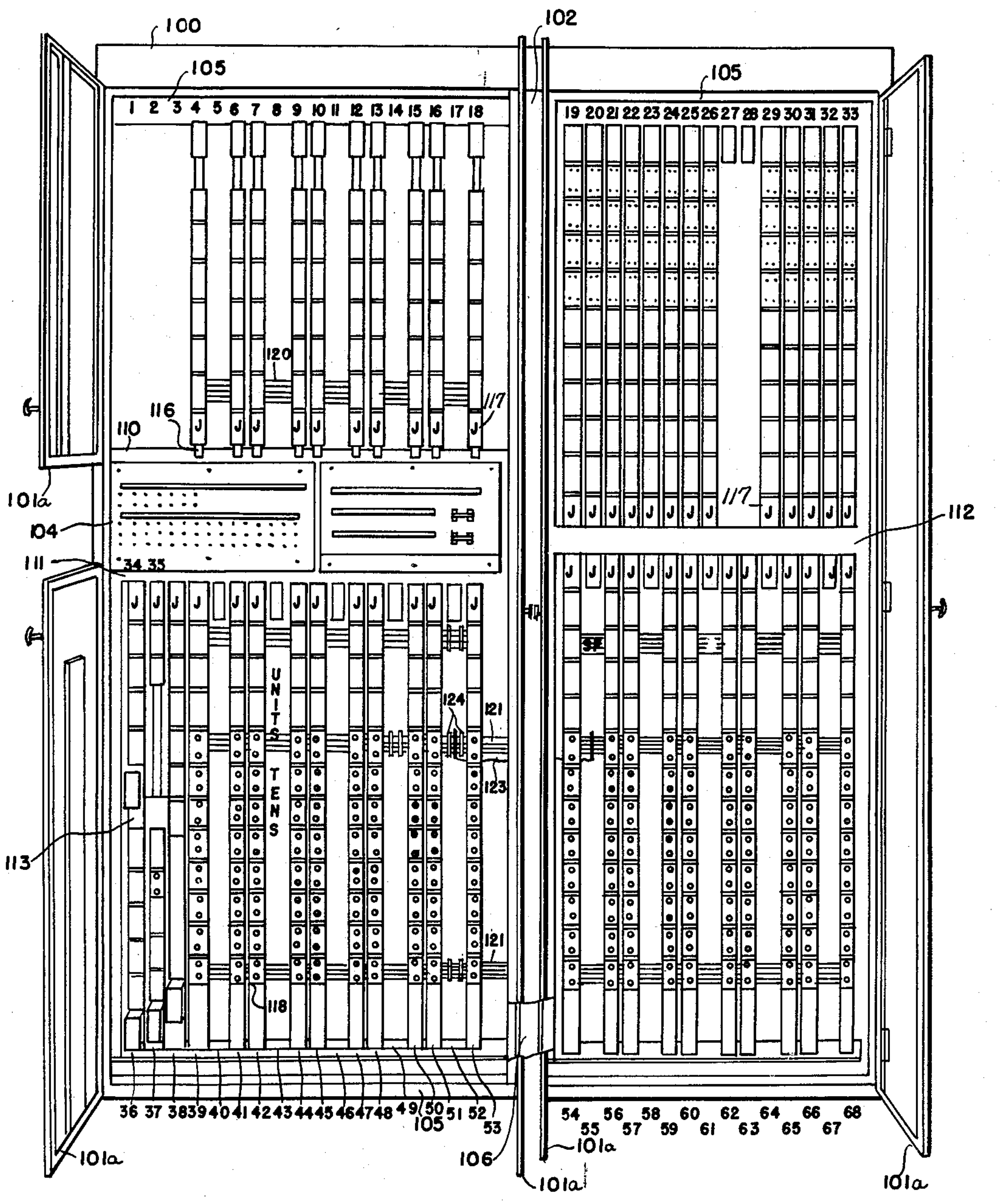
Figure 1 is a view in front elevation of the novel basic unit or hundred line bay of the improved telephone exchange.
Figure 2:
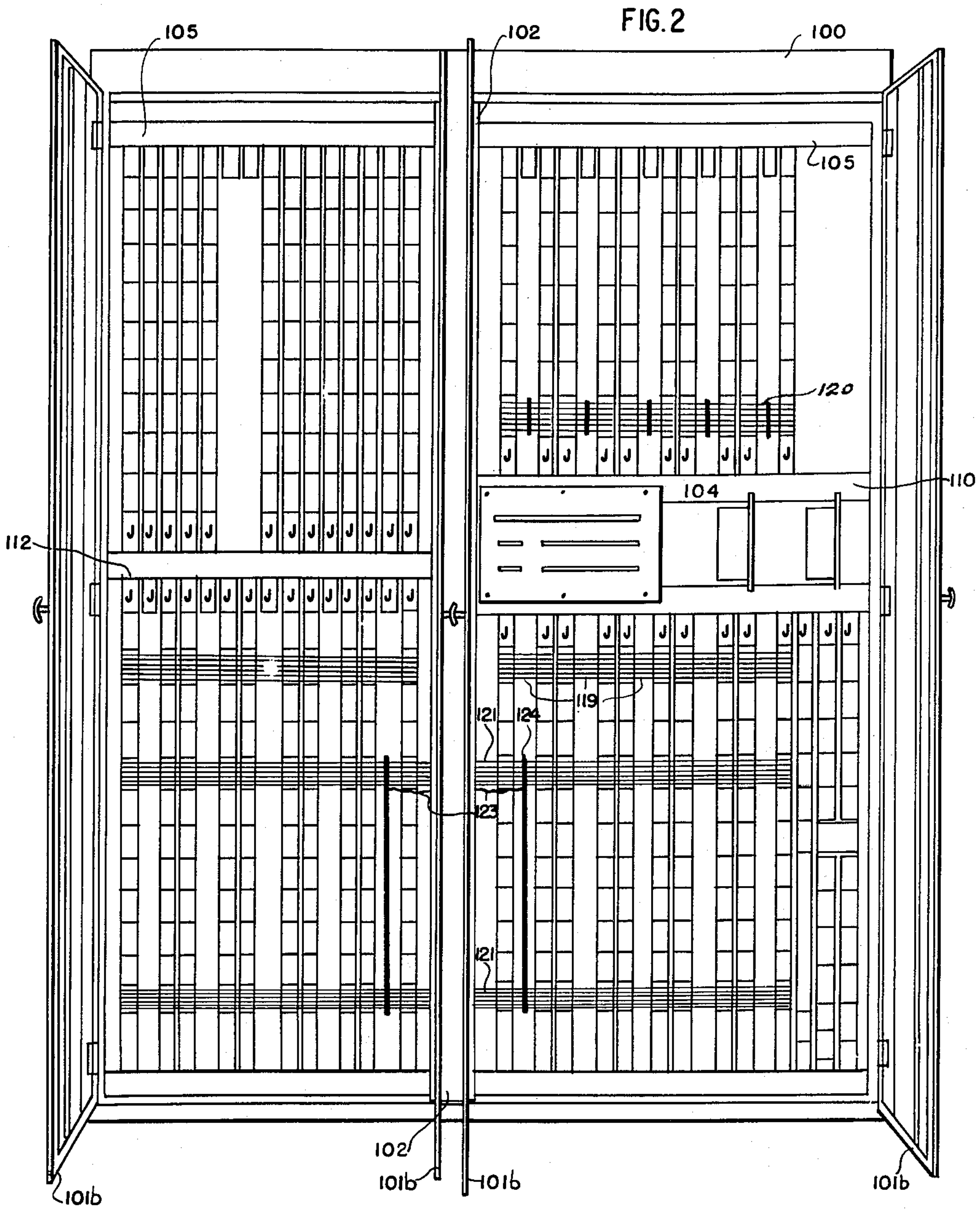
Figure 2 is a view in rear elevation of the basic bay of Figure 1.

With reference now to Figure 1 of the drawings, there is schematically illustrated thereat the functional switching units of the novel exchange bay, the structural form of which is more completely illustrated in Figures 1 and 2.

Figure 6:
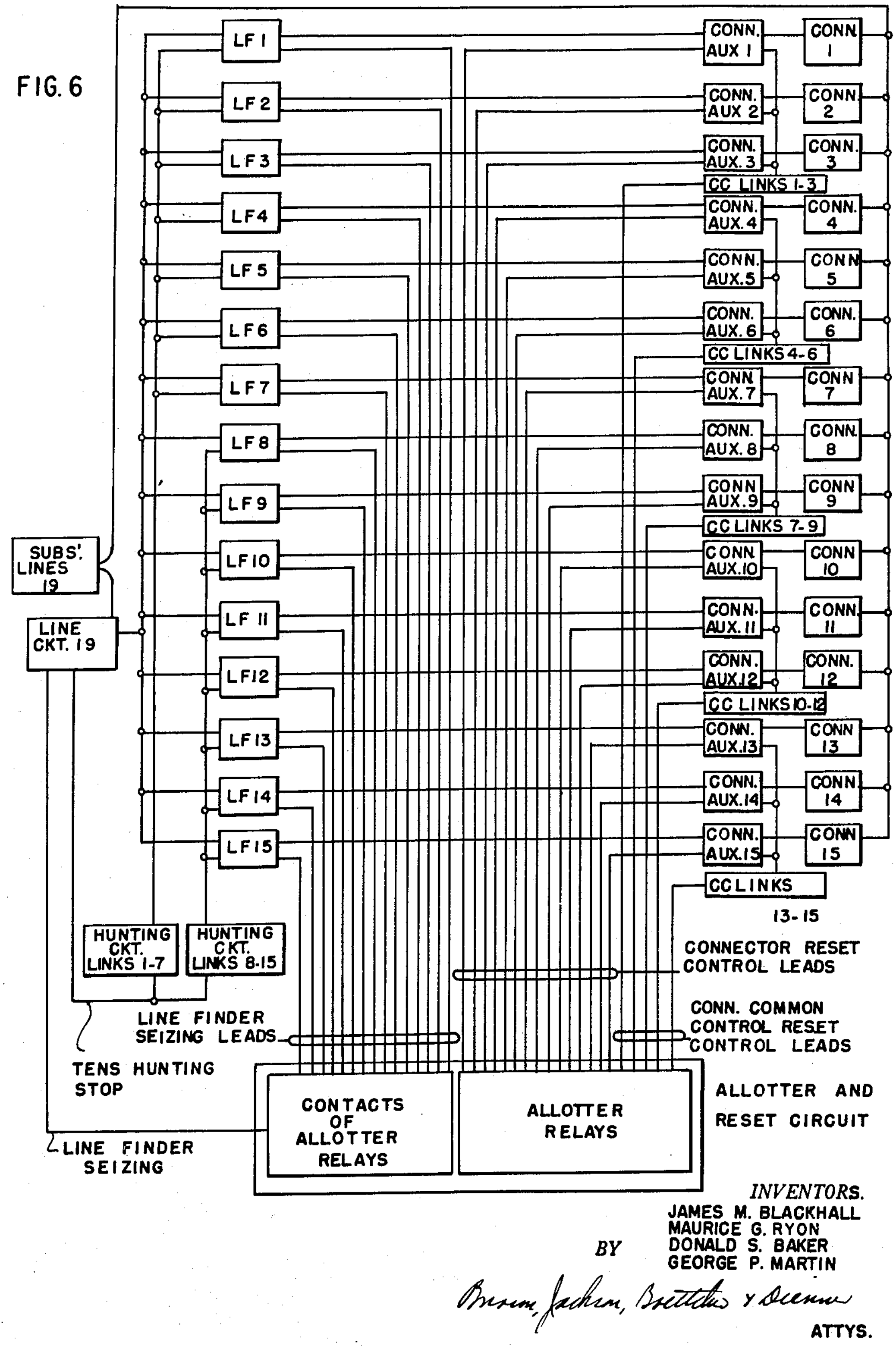
Figure 6 is a schematic layout of the circuit arrangement of the exchange.

To minimize the complexity of the disclosure, the schematic illustration of Figure 6 sets forth the switching units for serving one hundred subscriber lines which are schematically represented by the illustrated subscriber line 19. The illustrated hundred line exchange is readily expandable for use in larger exchanges by reason of the new circuit features and structural embodiments disclosed herein.

The illustrated hundred line arrangement basically consists of subscriber line circuits, as shown at 19, and line finder links LF1–15 and connector links C1–15. In the event that the equipment is to be used in larger size systems, the basic equipment also includes selector switch units.

The operation of the novel all-relay system in extending a connection between a calling one of the subscribers 19 to a desired one of the subscribers will be described briefly hereat.

The subscriber lines of the one hundred line system are divided into groups of ten, i. e. 11 to 10, 21 to 20, 31 to 30, etc., subscriber 19, for example, being the ninth party of the first group of ten subscribers. Each subscriber in the exchange is provided with conventional handset equipment and by operation of the dial associated therewith to transmit the proper units and tens group identification digit may select any one of the other subscribers in the exchange As illustrated in the schematic sketch of Figure 6, each subscriber line, such as 19, has associated therewith a line circuit 19.

As the subscriber on line 19 initiates a call by raising the receiver of his handset, the equipment in the associated line circuit 19 is energized and signals the line finder equipment LF1–15 over the line finder seizing leads S–19 that the extension of a call is desired by the subscriber on line 19. The particular line finder to be chosen is determined by the particular combination of allotter relays A1–AN and the position of the associated contacts, such equipment being arranged to preselect the line finder equipment for use in a given sequence.

The line finders LF1–15 and associated hunting chains are divided into two groups, i. e. LF1–7 and LF8–15 to guard against a lockup of the system. Assuming line finder LF5 in the first group LF1–7 is chosen for use by the allotter equipment as the call is initiated by subscriber 19, chain equipment in the hunting circuit HC1–7 is energized and steps in a predetermined sequence in its hunt for the ten's group identification number of the calling line (for subscriber 19, group one). The corresponding tens relay on the line finder LF5 is then operated and the line finder LF5 hunts by means of its associated finder relays and the marked line in line circuit 19 for the units identification number (nine for subscriber 19). The corresponding line finder units relay is then operated and the hunting circuit 1—7 released for further use.

The line finder LF5 is interconnected with the connector switch C–5 and with operation of the proper tens and units relays on the line finder the connection is extended to the connector auxiliary circuit CA5 and its associated connector circuit C5. The connector auxiliary circuit CA5 operates to energize the common control circuit CC2 which is associated with common auxiliary circuit CA3—CA5. With the seizure thereof corresponding ones of the allotter relays A5 are released to route further incoming calls to others of the links.

With the seizure of the common control circuit CC5, dial tone is returned to the subscriber and the identification digits of the desired party are dialled. The corresponding ones of the connector relays operate to place ringing current on the desired line and thereby signal the wanted party. As the called party answers, the connector common control releases.

It is seen from the foregoing that when the equipment is arranged to share seizure and dialling functions on a fifteen line finder connector link switchboard, there are a total of five common connector controls CC1–5, with three connector links C1 to C3 etc., for each connector control. Other arrangements may be used in an obvious modification where abnormal traffic conditions exist. The all relay equipment, of course, includes numerous other conventional miscellaneous elements such as lockout, busy tone, timing relay equipment and guard equipment, etc., the foregoing description being included for the purpose of illustrating the various functions of the switches illustrated in detail in the other figures.

a. *General structure*

Referring now particularly to Figures 1 and 2 of the drawings, the equipment of the novel one hundred line bay unit (partially assembled) of Figure 6 is shown in the improved demountable type arrangement of the invention. As there shown, the equipment is housed in a sheet metal cabinet 100 having hinged doors 101 in the front and rear and a removable top (not shown) to permit ready access to the interior of the cabinet. The cabinet for each bay is approximately 10½′ high, 6′ wide and 9″ deep, the equipment which is enclosed within the cabinet of these dimensions being arranged to provide one hundred subscriber lines with an improved type of service.

As mentioned heretofore, in exchanges of larger sizes a series of one hundred line bays, such as illustrated in Figure 1, are interconnected in groups as determined by the number of lines to be served, each bay in such use being modified by the addition of appropriate selector switch equipment. In this manner all-relay systems of ten thousand lines and more may be readily provided.

As an example, when multiples of the illustrated basic bay unit 100 (as modified by the addition of first selector switch equipment) are used, exchanges of up to seven or eight hundred lines may be provided. If the exchange is to be expanded to serve even larger installations, such as thousand line exchanges, etc., the bays are necessarily further modified by the addition of second selector switching equipment as will be apparent to those parties skilled in the art.

Various arrangements of the multiple cabinets in a larger size exchange may be accomplished in accordance with the particular economy in floor space and floor design which is to be effected. Where space is a primary consideration, a particularly economical arrangement comprises the positioning of the bay units in a back-to-back and front-to-front arrangement on alternate narrow and wide aisle floor plans. Other methods of arrangement are, of course, obvious to experienced personnel.

Access to the equipment in the cabinet is effected through five narrow doors 101*a* on the front face of the cabinet, and four doors 101*b* on the rearward side thereof. Two removable pilasters 102 are provided at the cabinet center to support the two front center doors 101*a* and the two rear center doors 101*b*. The front right hand side of the equipment is provided with a two sectioned door, each of the door sections being shortened to permit access to a flush mounted routining panel 104 which is located midway of the right section of the bay.

Suitable door catch means may be used to maintain the doors closed during normal operation, the routining panel 104 being accessible at all times without requiring the opening of the doors whereby the possibility of entry of dirt and other foreign material into the operating relay equipment is minimized.

The operating relay equipment is strip mounted as more fully described hereinafter, which strips are in turn mounted on a rectangular shaped frame member 105 and formed to fit within the inner dimensions of the cabinet 100. A heavy vertical channel 106 is set slightly to the right of the center of the unit behind pilaster 102, the open side of the channel 106 facing the front or relay side of the frame. The outer frame members which form the rectangular portion of the frame 105 are somewhat smaller in dimension than the center channel member 106. The rectangular frame 105 is divided into five sections by laterally disposed horizontal supports 110, 111 and 112, the support members 110 and 111 extending between the central channel 106 and the vertical left hand member of frame 105 to divide the left hand side of the bay into three sections; the support member 112 extending between the center channel 106 and the right hand member of frame 105 to divide the right hand side of the cabinet into two sections.

Each of the five sections are in turn sub-divided to receive the vertical relay bearing strip equipment as shown in Figure 1, the left hand sections being arranged to mount eighteen vertically disposed relay strips and the right hand sections being arranged to receive fifteen vertical relay strips. The two strip spaces at the left of the lower left hand section is divided horizontally into two parts by a short horizontal mounting bar 113 to provide mounting space for four separate relay mounting strips which are one-half the length of the other strips in the section.

The left hand center section formed by horizontal bars 110 and 111 is occupied by terminal blocks, fusing for all the circuits, routine equipment for all controls and links, and two short strips of miscellaneous control relays. The rectangular frame 105 is mounted centrally of the nine inch deep cabinet whereby elements may be mounted both rearwardly and forwardly of the strip units. A rearward view of the basic bay exchange arrangement and the manner in which such elements are mounted is shown in Figure 2.

*Arrangement of relay units on individual strips*

As illustrated in Figure 6, adequate service for one hundred subscriber lines of equipment will be provided by a basic bay arrangement comprising fifteen line-finder connector links and the equipment associated therewith. As previously mentioned, the relay switching equipment is divided into predetermined relay groups on individually assigned vertical strips, such as indicated at 114, strip members 114 may be of any feasible support design, one practical embodiment comprising a U-shaped, channel support member having tapped apertures spaced along its length to accommodate fastening means for securing each of the assigned relay units thereto. Each end of the strip such as 114 supports a lug 115 (Figure 3) which is apertured to accommodate fastening means, such as the illustrated screw means 116, the fastening means 116 extending through the aperture in lug 115 and into the frame support members for the section, such as 105 and 110 for section 1. The grouping of the relays and the positioning of the exchange relays on the strip members in the bay is set forth in detail in Figures 1, 2 and 7.

As shown in these figures, the first three vertical strip spaces 1, 2 and 3 of the upper left hand section of the bay are left blank for future expansion. The fifteen link auxiliary strips (Conn. Aux. 1–15 Fig. 7) are mounted in the strip spaces 4 to 18. The connector link auxiliary mounts such relays as the connector line relays, the timer relays, impulse correcting relays, supervisory hold relays, etc.

The one hundred line circuits (such as the line circuit 19, Figure 6) are divided into groups of ten and the tens groups are mounted on ten strips for mounting in spaces 19 to 28 located in the upper section of the right hand side of the frame. Line circuits 11 to 10 are mounted on the first strip 19 in descending order; that is, line circuit 10, 19—12, 11. The second strip 20 mounts the line circuits 21 to 20 in a similar manner, the third strip mounts line circuits 31 to 30, etc. Each line circuit includes such units as the line relay, lock out relay, cutoff relay, etc., as shown in the copending application.

The common control equipment for the connector switches (CC1–3, 4–6, 7–9, 10–12 and 13–15, Fig. 6) are mounted on strips disposed in spaces 29 to 33 in the remaining portion of the upper right hand frame section. Each connector control strip CC1–5 is associated with three assigned connector switches as illustrated schematically in Figure 6, and mounts busy tone, dial tone, switching relays, etc.

The key lamp, jack and fuse panel 104 are located in the middle section of the left hand portion of the frame. Two half strips 34 and 36 disposed in the first vertical space of the left hand section mount the line hunting chains (hunting circuits 1–7 and 8–15, Fig. 6). Two half strips 35 and 37 mount the common alarm equipment for the exchange such as the metering, alarm sounding, etc. units. Strip 38 mounts the link allotter equipment (allotter and reset equipment Figure 6) which includes allotter relays A1 to A15 and relays CA1 to CA5.

Strips 39 to 53 mount the relay equipment for the fifteen connector links of the system (C1–15, Fig. 6) each strip supporting one connector switch which comprises ten units relays and ten tens relays. The units and tens relays are mounted in tandem on the strip with the units relays at the top and the tens relays below.

The fifteen line finder links (LF1–15, Fig. 6) are mounted on the fifteen strips 54 to 68 which are attached to the lower right hand section of the frame. Each of the line finder links 54 to 68 comprises ten units relays and ten tens relays, the unit and tens relays being mounted in tandem on each of the strips with the units relays at the top and the tens relays below.

*Wiring classifications*

In general, the wiring of each bay is divided into three types of connection.

Figures 3, 4A, 5A:
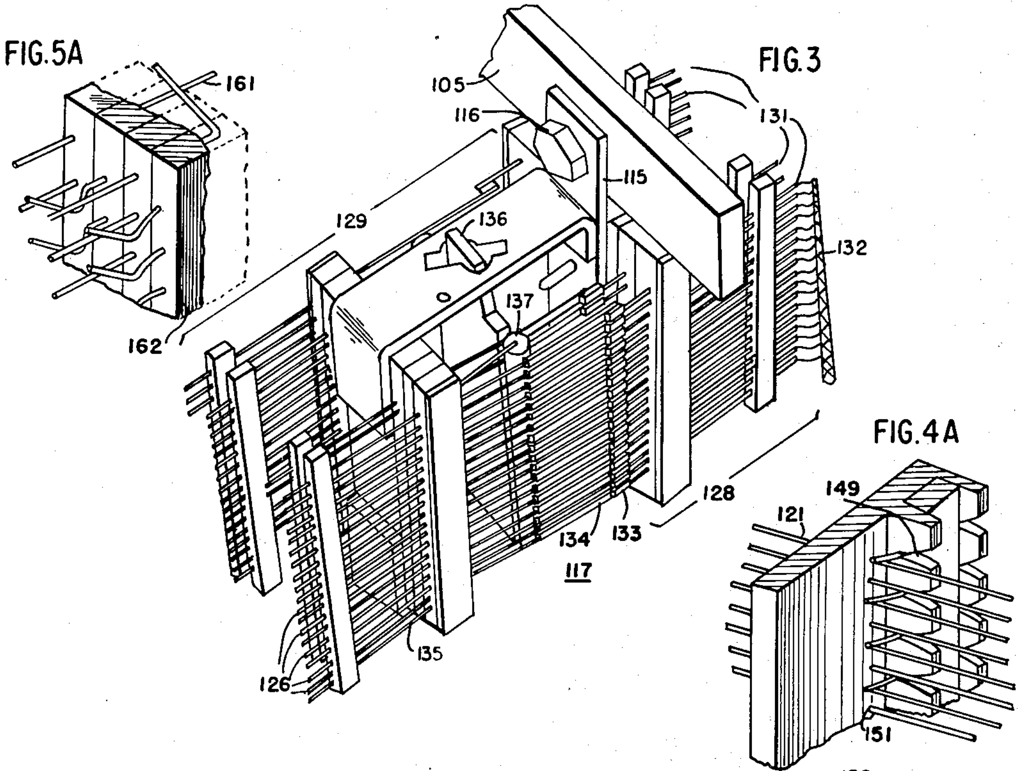
Figure 3 is a perspective view of a novel "position-then-lock" multi-contact jack which accomplishes convenient and rapid interruption of the interconnections which are necessarily effected between the relay members in the various strips.
Figure 4*a* is a perspective view of the connection.
Figure 5*a* is a perspective view of the forward end of the plug-in jack.

(*a*) *Strip wiring.*—This category includes the wiring which forms integral portions of each of the strip units 114, including the connections between the relays, condensers, resistors; the wiring extending from the strip relays to the terminals of the strip half of the multi-contact position-then-lock jack 117 as shown at 126 Figure 3; the vertical multiple (indicated generally at 118, Fig. 1); and miscellaneous circuit wiring to the anvils of the tens and units relay (strips 39 to 68 inclusive, Fig. 1).

(*b*) *Internal unit cross connecting and multiple wiring.*—This category includes short bare wire multiples, such as 119 and 120 (Figures 1 and 2), extending from link connect relays to common controls; the long or talking rear bare wire multiples 121 (Figs. 1 and 2) which connect all like tens levels of links to multiple terminations; the ringing tone and timing cable, the battery ground distribution cable, general purpose cross connect cable (all not shown to avoid excessive detail in the drawings), and the normal multiple cable 123 that connects the line relay strips 19—26 bare wire terminations on the line finder connector link 41—68.

(*c*) All incoming cables which attach the unit to the main frame, to other units, to sources of power, tone, ring and timing equipment (not shown).

*Cable connections*

The majority of cables on the switchboard (with the exception of the strip cables) are disposed vertically within the confines of the center frame channel 106 and radiate horizontally therefrom to the proper connecting points on the strips as exemplified by conductor 123 (Fig. 1). The incoming cables (group C) which arrive from other units drop vertically from an overhead runway into the front of the vertical center in the side frame channels 105, and connect either to the line-finder connector multiple terminations (strip 39—68) or to the miscellaneous terminal fusing and routining center 104 on the left hand side of the board. The incoming cables (not shown) are clamped to the horizontal bare wire conductor multiples by novel plug-in jack equipment, as shown generally at 124 in Figures 1 and 2, and specifically in Figure 5. A more detailed description thereof appears hereinafter and in the copending application which was filed on May 15, 1951, by George P. Martin and James M. Blackhall and assigned Serial No. 226,373 and assigned to the assignee of this invention.

*Strip connections*

The individual relays of each group on a strip may be permanently connected in the conventional manner. Each relay on a line-finder or connector link strip 39—68, for example, is conventional in structure and are accordingly only briefly described hereat. The units relay (Fig. 1) have six make contacts and the tens relays have thirty-six make contacts which are all closed at the same time when the associated relay coils are energized. The corresponding thirty make or anvil contacts are multipled from one tens relay to another in the same connector by vertical multiple members, and are finally connected to the anvil contacts of the units relays, each set of three vertical wires leading to a different units relay. Vertical front multiple connects the first line set of anvil contacts (1, 2 and 4) of all the tens relays in the connector to anvil contacts 1, 2 and 4 of the first units relay of the same connector; the second set of line contacts (3, 6, 5) is connected to anvil contacts 1, 2, 3 of the second units relay, etc. Odd numbered relays have positive, negative and "P" wires connected to anvil contacts 1, 2 and 4 respectively; even numbered unit relays have positive, negative and "P" wires connected to anvil contacts 1, 2, and 3 respectively.

The interconnections for the relays on a line-finder strip are accomplished in substantially the same manner.

Certain of the terminals of the units and tens relays are connected in multiple with corresponding ones of the relays on adjacent links by so-called bare wire multiples 121 (Fig. 1) which extend the width of the connector and line-finder links 39–68 inclusive. This interconnection of the equipment is more specifically shown in the Patent 2,415,437 which was issued to F. R. McBerty on February 11, 1947, and is assigned to the assignee of this invention. Specifically, the tens relays have thirty-six make contacts and the units relays have six make contacts, each ten line group being connected to the lever reed contacts of its associated tens relays in all line finders by a bare wire multiple extending therebetween. Inasmuch as there are three wires per line within the exchange, a positive (+) and negative (−) talking pair, and one test wire (P), the ten lines occupy thirty contacts of the tens relays. The interconnections for the line finder connector link strips 39 and 68 as accomplished by the bare wire horizontal multiples 121 is shown somewhat schematically in Figures 1, 2 and 7, because of the minuteness of the detail required in illustrating the extension of thirty such lines between the various units.

The bare wire multiples are tapped in two places between the fifteen line-finders and fifteen connectors by plug-in jack equipment, such as 124, this double parallel connection permitting the change of any line to a trunk and back to a line by cutting the multiple in the rear and restrapping the pins in the front. The connection also presents to the field installers a clean and unused set of pins to which line cables may be connected.

The strip cables will be somewhat conventional in nature with the exception of the wiring of the strip jack and the composite spark protection condenser resistor cans which are included for use therewith. Relay strip cables which come to the front of the strip at the top pick up the jack connections and will also pick up the connect relay anvils and the miscellaneous front bare wire circuits. These strip cables will be made of insulated nickel wire, all other wire being made of insulated tinned copper. The transition from nickel to copper wire is to be made at the jack contact points, and at the control multiple plug-in jacks. All connections are to be soldered with the exception of strip cable connections which are to be welded. Mechanical connection of the soft copper wire to the hard steel or nickel wires is to be made either with the twirling or hook technique. Stainless steel for solder connections will be nickel flacked, copper plated and tin dipped.

*Interconnections between strips*

Figure 7:
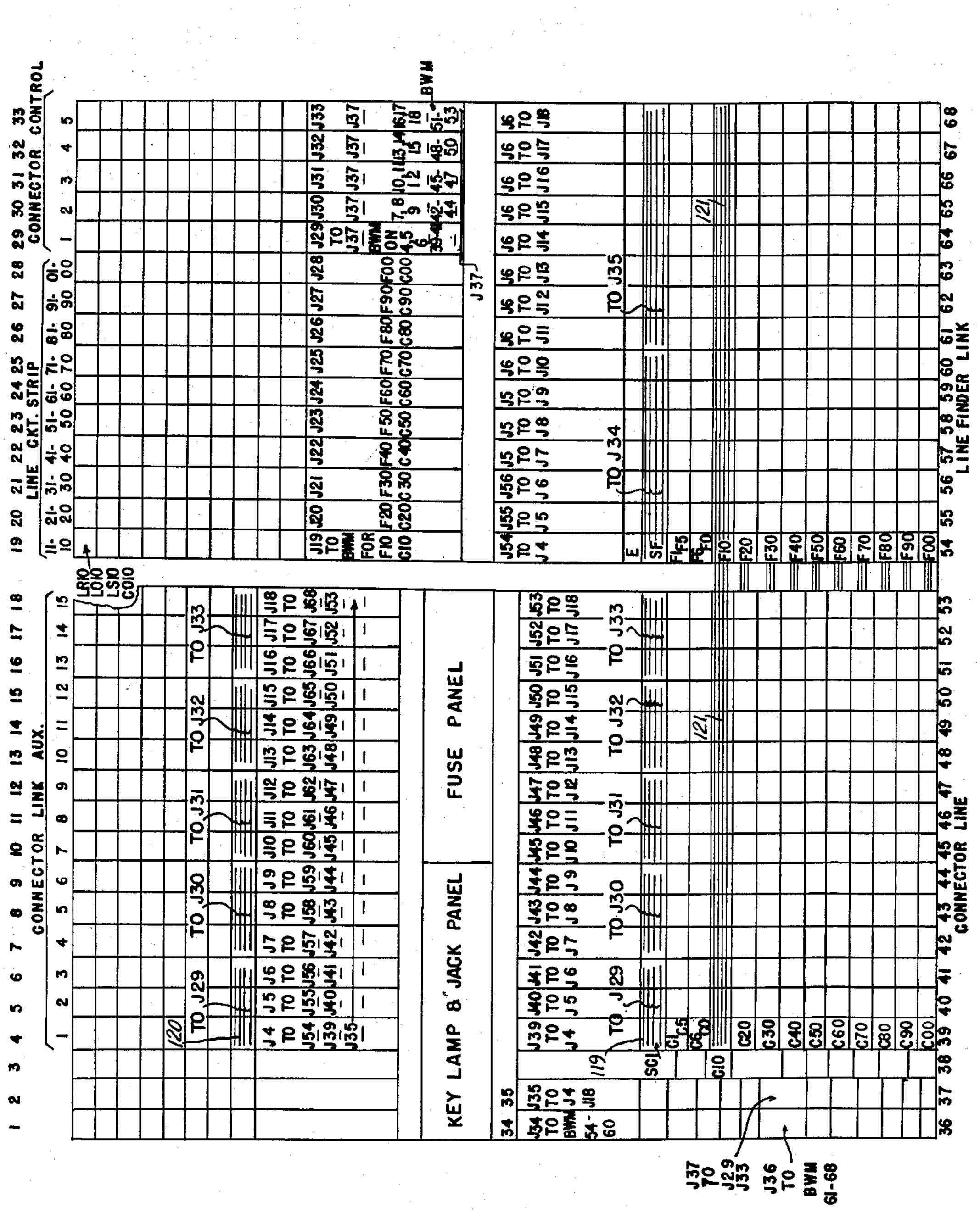
Figure 7 is a schematic representation of the physical circuit interconnections required in the bay of Figure 1 to provide the circuit arrangements of Figure 6.

As illustrated substantially in Figure 6, and in greater detail in Figure 7, numerous multiple connections extend between the relays of the various strips, the number of connections extending from a single strip frequently exceeding ninety.

With reference to Figure 7, the equipment on the line circuit bearing strips 19 to 28 is necessarily connected to the equipment in the line finder connector link bearing strips 39—68, if the communication links are to be extended thereover by the line circuit as over its associated subscriber line. Thus, the line circuit bearing strip 19, which mounts the line circuit equipment for lines 11—10, must be connected to the group of horizontal bare wire multiples 121 which interconnect the tens relays F10—C10 of all line finder connector links. Similarly, the equipment on the second line circuit bearing strip 20 (which is associated with subscriber lines 21 to 20) must be connected to the group of horizontal bare wire multiples 121 which extends between the tens relays F20 and C20 of all line finder connector links. The remaining line circuit bearing strips 21 through 28 must be similarly interconnected with the horizontal bare wire multiples of the remaining corresponding finder connector link relays F30—C30 to F00—C00. These connections are effected by novel "position-then-lock" jacks 117 and "plug-in-jacks" 124 as will be described hereinafter.

Inasmuch as the particular one of the line-finder connector links on strips 38—68 to be chosen in establishing a connection depends upon the particular combination of allotter relays A1—A15 operated at the time of call initiation, the equipment on the line finder links 54 to 68 must be interconnected with the hunting circuit links HC1–7, 8–15, which are carried by strips 34 and 36 respectively, the hunting circuit for line finders 1 to 7 being carried on strip 34 and the hunting circuit for line finders 8 to 15 being carried on strip 36. In the illustrated embodiment, the connections from the jack 117 associated with the line hunting chain strips 34 and 36 are connected over novel position-then-lock jacks J34 and J36 to the short section horizontal bare wire multiples 121 for the SF relays on the line finder link strips 54, 68, the jack J34 being connected to the horizontal bare wire multiple 121 which extends between the line finders 1–7 on strips 54 to 60 and the jack J36 being connected to the horizontal bare wire multiple 121 which extends between the line finders 8–15 on strips 61 to 68.

With the seizure of the proper line finder tens and units relays of the seized link by the operative one of the hunting chains, the associated one of the connector auxiliary circuits CA1—CA15 and the associated connector circuit C1—C15 are operated and accordingly the equipment on the line finder strips 54—68 must be connected with the relays on connector link auxiliary strips 4 to 18, inclusive. The first line strip 54, for example, is connected over jack 54 to jack 4 on the first connector link auxiliary strip 4, the second line finder link 55 is connected over jack J55 to jack J5 on the second connector auxiliary strip 5 etc.

Each set of connector link auxiliary equipment CA1—CA15 on strips 1—15 is associated with a corresponding connector switch C1—C15 on strip 39—53, and are operatively interconnected therewith. As illustrated in Figure 7, the first connector auxiliary link equipment CA1 on strip 4 is connected over jack 4 to jack 39 for the first connector switch C1 on strip 39; the connector link auxiliary equipment CA2 on strip 5 is connected over jack 5 to jack 40 for the second connector switch C2 on strip 40, etc. The jacks 39—53 are also of the novel position-then-lock type shown in Figure 3.

As previously pointed out, one of the set of connector control equipment CC1—CC5 is common to each three of the connector switches C1—C15, this common connector control equipment being mounted on strips 29 to 33. As one of the connector auxiliary units CA1—CA15 is seized, it must effect energization of the associated one of the common control equipment CC1—CC5 and accordingly interconnecting conductors extend therebetween. For example, the first common connector control equipment CC1 on strip 29 is common to the first three connector switches C1—C3 on strips 4, 5 and 6 and is tied to the horizontal bare wire multiples 120 thereof, the connection extending from the relays on strip 29 over jack J29 to jack J4 and the horizontal bare wire multiple which extends between strips 4, 5 and 6. Similar interconnections are made between the common control equipment CC2—CC5 on strips 30—33 and the associated groups of the connector link auxiliary units CA4—CA15 on strips 7—18.

Each of the connector link auxiliary units CA1—CA15 are also connected over the associated jacks J4—J18 and J35 to the timer equipment which is mounted on strip 35.

The common connector control equipment CC1—CC5 on strips 29 to 33 is connected over the associated jacks J29—J33 to the associated one of the connector switches C1—C15 on strips 39—53, the first connector common control equipment CC1 on strip 29 being interconnected with the first three connector switches C1—C3 which are mounted on strips 39, 40 and 41, the second common control equipment CC2 on strip 30 being connected to connector C4—C6 on strips 42, 43, and 44 etc.; the connection for the first control arrangement extends from the control relays on strip 29 over jack J29 to a plug-in-jack, such as 124, which fastens to the horizontal bare wire multiple 120 which is multipled to the terminals of the SC1 relay for the first three connector switches 39, 40 and 41. The succeeding connections between the connector controls CC2—CC5 and the connectors C4—C15 are made in a similar manner.

The connector control equipment on strips 29 through 33 is also interconnected over jacks 29—33 to jack 37 for the common alarm and metering equipment as mounted on strip 37.

The tens relay C10—C00 and units relays C1—C0 of each of the connector switches C1—C15 are in turn interconnected with the main distributing frame (not shown) whereby access to each of the subscribers in the exchange is readily effected, these connections being effected by means of plug-in jack means, such as 124, and flexible cable means extending between the connector switches C1—C15 and the MDF.

The general cross connect cable, ringing tone and time cable, and battery and ground distribution cables may be of the conventional built up and laced type; since these cables run over a considerable area of the switchboard a point to point description of the connections of these cables is not practical, but will be understood by those familiar with the art.

*Demountable strip connections*

The novel all-relay telephone exchange system disclosed herewith is effectively competitive in its use in all sizes of exchanges by reason of its outstanding flexible type structure and its competent operating characteristics. The flexible arrangement is primarily achieved by the provision of an exchange in which the equipment is divided into predetermined groups, and in which the groups are adapted for demountable attachment to the exchange frame. In most instances a given portion of the equipment may be removed from the exchange bay by the simple expedient of removing two fastening members which mount each group to the frame.

The aforegoing description set forth, in detail, a particularly successful arrangement of the equipment which permits grouping of the members in such manner that expeditious demounting of the equipment may be accomplished. The disclosed arrangement also sets forth the manner of mounting a given amount of equipment in a minimum amount of space.

An indication of the numerous interconnections which must necessarily be made between the relay equipment on each of the various strips is clearly provided hereinbefore and the difficulties and problems experienced in the provision of a demountable or detachable type sectionalized all relay board is evident therefrom.

It is recalled that each group of relays is attached to a strip support member 114 and that the strips are vertically positioned in side-by-side relation on the exchange frame, the attachment thereto being effected by suitable fastening means, such as the illustrated screw means 16.

Each strip member 114 is jack ended by a novel jack unit such as 117. As shown in Figure 3, the jack 117 is divided into two basic portions which are identified as the strip mounted portion 129 and the frame mounted portion 128. The frame mounted portion 128 is attached to the horizontal frame members, such as 105, and mounts a series of banks of armature bearing reed members, such as indicated at 131. The rearward portion of the banks of reeds are arranged in insulated spaced relation, and flexible conductors, such as 132, extend from the other jack units in the exchange to extend circuits of the other relays in the equipment thereto.

The forward end of the banks of reeds 131 mount contact bearing armatures 133 which are arranged to extend the circuits of the flexible conductors 132 over associated contact bearing armatures 134 on reed members 135 as carried by the strip mounted jack portion 129. The rearward portion of the reed members 133 on the strip mounted portion 129 are maintained in insulated spaced relation and are arranged to be connected to the terminals of the various relay contacts which are carried by the strips 114. An actuator member 136 and associate actuators, such as 137, are arranged to control the movement of the armatures 134 associated with the reeds of the strip mounted jack portion 129 into and out of contact with the positioned armatures 133 mounted on the reeds of the frame mounted jack portion 128.

As shown in Figure 3, the actuators 136 and 137 are in the operated position, whereby the circuits extending from the relays on the associated strip member over the conductors 126 and the reeds 135 are extended over armatures 134 and 133, and the reeds 131 to the conductors of the flexible cable 132. The actuator member 136 in its operated position continually exerts pressure against the adjacent reed banks which in turn transmit the pressure through the auxiliary actuators 137 to further reed banks, whereby the contacts on the reeds are under pressure and a positive firm connection is insured.

The strips such as the connector auxiliary strips 4—18 (CA1—CA15) which have no other connection to the other exchange equipment except those which are made over the associated jacks J4—J18 may be dismounted from the exchange by merely operating the jack actuator 136 to its open position (as indicated by the oblique slot position in Figure 3) to effect the interruption of the contact between the reed armature members 133 and 134 of the frame and strip mounted jack portions 128 and 129 respectively, and loosen the two fastening members such as illustrated at 116.

The following specific example is given as exemplary of the connections effected by means of the jack member. With reference to the jack J4 located at the lower end of the connector auxiliary strip 4 in Figure 7, the rearwardly protruding reed members, such as 131 (Fig. 3), on the frame mounted jack portion 128 will be connected by a flexible cable such as 132 to the rearwardly protruding terminals 131 on the jack J54 located at the upper end of the line finder strip 54, conductors of the flexible cable 131 being soldered to the appropriate ones of the rearwardly protruding reed members on each of the frame mounted portions 128 of the jack J4 and J54. The corresponding reed members of the strip mounted portion 129 of jack J4 will be connected by conductors, as indicated at 126, to the assigned relays on the associated strip 114. Similarly, the strip mounted portion 129 of the jack J54 on the line finder link strip 54 will have its reeds connected, as shown at 126, to the proper tens and units relays mounted on the associated strip. Other connections to jacks J4 and J54 are made in a similar manner as shown in Figure 7.

In the event that the connector auxilary link is to be removed for repairs, traffic distribution reasons, etc., the actuator key 136 on the associated jack 117 need merely be operated to its contact-opening position to interrupt the connection between the strip and frame mounted jack portions 128 and 129; the fastening means 116 located at either end of the strip removed, and the strip detached from the frame.

Figure 4:
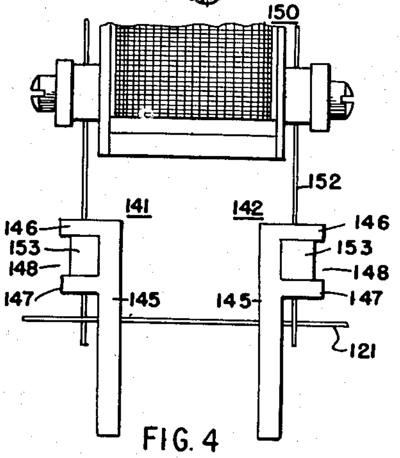
Figure 4 is a top plan view of a new and novel wedge lock unit for effecting positive contact in the connections of the multiple terminal relays to the bare wire multiples.

In Figure 7 the equipment on each of the line finder strips 54—68 is schematically illustrated as being interconnected with the equipment on the connector strips 39—53 by means of a series of horizontal bare wire multiples 121, the connection between the bare wire multiples and the equipment on the line finder and connector strips being effected by novel wedge lock to multiple means which are operable to permit disconnection of the line finder and connector links from the bare wire multiple and the removal of the strips from the exchange board. The novel disconnection means which renders such disassembly possible is illustrated in Figure 4, reference being made for a more detailed description to the copending application which was filed by Maurice G. Ryon and Donald S. Baker on May 15, 1951, and assigned Serial No. 226,374.

*Wedge lock to multiple*

As shown in Figure 4, the wedge lock to multiple unit 140 comprises a pair of wire clamps 141 and 142 mounted on the horizontal bare wire multiple 121 in a horizontal slidable manner.

The slidable wire clamps 141, 142 each comprise a base portion 145 having a pair of perpendicularly disposed parallel flanges 146, 147 forming a receiving channel 148 at the one end thereof; each pair of clamps 141, 142 in their mounting on the multiple wires 121 are mounted in back-to-back relation with the receiving channels 148 facing in opposed directions.

The flange portions 146, 147 are transversely slotted at predetermined spaced intervals as indicated at 149, the slots being located at intervals which are twice the normal spacing which exists between the adjacent ones of the multiple bare wire conductors 121.

Each slot 149 is dimensioned to receive an assigned one of the rearwardly extending reed members 152 of a cooperating relay unit, such as illustrated at 150. A leading edge is provided for each slot which is angled at 60° from the major axis of the slot to facilitate entry of the assigned relay reed therein.

A series of apertures 151 located on the base portion 145 immediately adjacent the base of the innermost one of the flanges 148 are spaced at intervals equivalent to the distance between adjacent ones of the bare wire multiples 121 whereby each aperture 151 is arranged to support an assigned multiple member 121. The guides 141 and 142 of each pair are mounted on the multiples 121 in offset relation with each other, whereby the alternate slots 149 of guide one of each clamp pair is aligned with the even numbered ones of the bare wire multiples 121 and the alternate slots 149 of the other guide of each clamp pair are aligned with the odd numbered ones of the bare wire multiples 121. Thus, each one of the bare wire multiple 121 is aligned with a slot on one of the flanges of the clamp pair.

Each of the slots 149 of the clamp pair, in addition to being aligned with one of the bare wire multiples, are also aligned with an assigned relay terminal 152 and are effective in their operation to complete a pressure contact between the rearwardly extending terminal 152 of the telephone relays 150 in the exchange and the horizontally extending bare wire multiples 121.

In operation, preparatory to mounting a relay bearing strip in the exchange, the slidable wire clamps 141, 142 are positioned in back-to-back relation at the central point of their operating limits (as determined by adjacent cross bar supports, not shown) to facilitate the mounting of the strip members 114 to the exchange frame. As the strip 114 is brought into position the rearwardly extending reeds 152 of the relays 150 will be inserted between corresponding ones of the bare wire multiples 121, the left hand relay terminals being adjacent the odd numbered ones of the bare wire multiples 121 and the right hand relay terminals being adjacent the even numbered ones of the bare wire multiples 121.

The wire clamps 141, 142 are then moved outwardly of their centralized position to bring the slots 149 thereon into engagement with the rearward portion of the relay reeds 152, the clamps 141 and 142 receiving the reed molding 153 on the relay terminals 152 within the confines of the channel 148. The reeds 152 are urged into the corresponding slots 149 on the flanges by the leading angled edge thereon. As the clamping guides 141 and 142 are moved along the multiples 121 into proximity of the beaded molding 153, the wedge portion of the slots 149 contacts the rearwardly protruding portions of the wire reeds 152 to encourage the movement of the reeds into firmer engagement with the adjacent one of the multiples 121 as well as into the flat or locking portion of the slots 149.

Since the bare wire multiples 121 are in alignment with the slots 149 and the wire reeds 152 are now being moved into the slots 149, a dimensional interference will occur between the bare wire multiples 121 and the rearwardly extending relay terminals 152. As further pressure is applied to the clamps, each of the relay terminals 152 is firmly fixed in a clamp-like grip by the two co-planar flange slots 149 associated with each of the terminal reeds 152 and the portion of the relay terminal reed which extends beyond the flange slots 149 is flexed slightly by reason of the pressure applied thereto, this pressure being in the order of one hundred tons per square inch.

As the clamps are moved into final position with the reed molding 153 firmly entrenched within the channel 148 of the corresponding clamp, the flat locking portion of the slots 149 continue the application of pressure to each of the contacting members to establish a firm reliable contact between the bare wire multiples 121 and relay terminal reeds 152.

In the removal of a line finder strip from the exchange board the disassociation of the rearwardly protruding relay terminals 152 from the horizontal bare wire multiples 121 is effected by sliding the wire clamp guides 141 and 142 toward the central position to release the pressure contact between the relay terminals and the horizontal bare wire multiples as provided thereby. Following the unlocking of the horizontal bare wire multiples 121 from the relay terminals on the strip, the key 136 associated with the jack 117 at the end of the strip 114 is operated to its contact opening position, and the fastening means, such as 116, are loosened. The strip may now be removed from the frame.

In replacing the strip 114 no particular attention need be paid to the alignment of the multiples 121 with the relay terminals 152, the alignment being automatic by reason of the positioning effected at the respective ends of the mounting strip 114. Further alignment is effected as multiples 121 are clamped to the multiple relay reed molding 153 by the wedge wire guides 141, 142.

Through such basic arrangement a firm contact is established between the bare wire multiples and the relay contact reeds when in use and a reliable removable type connection which may be disassembled in extremely brief periods of working time is afforded.

*Plug-in jack*

Figure 5:
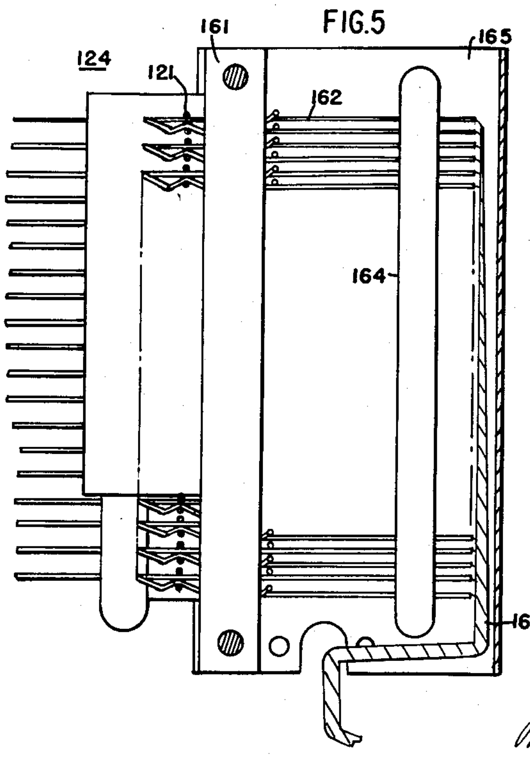
Figure 5 is a side sectional view of a novel plug-in jack for connecting flexible cable conductors to the exchange bare wire multiples.

The connections between the bare wire multiples of each of the bays in an exchange is accomplished, according to a further embodiment of the invention, by means of flexible cable which is terminated at either end by a novel plug-in jack unit 124 (Fig. 5). The multiple contact plug-in jack assembly 124 for accomplishing this purpose is set forth in section in Figure 5 of the drawings and in greater detail in the copending application which was filed May 15, 1951, by George P. Martin and James M. Blackhall and assigned Serial No. 226,373.

The plug-in jack 124 comprises a base support 161 which supports a series of reed members 162, the reed members 162 serving to make connection between the multiple bare wire conductors 121 at their forward ends and to provide suitable connecting means at their opposite or rearward ends for a flexible cable 163 which extends to a similar plug 124 and corresponding horizontal bare wire multiple equipment 121 of other bays in the exchange. The flexible cable connecting ends of the reeds 162 which protrude rearwardly of the base molding strips 161 are held in insulated spaced relation by molded beads 164 of suitable insulating material.

The reeds 162 are spaced in their mounting at a distance of approximately twice the spacing between adjacent bare wire multiples 121, alternate ones of the moldings being arranged in pairs as shown in Figure *5a*, each pair being arranged to establish contact with a particular one of the bare wire multiples 121. Adjacent molding strips 161 are offset so as to have the ends of their wire reeds effect a vertical displacement relative to each other which is approximately equal to the spacing between adjacent ones of the bare wire conductors 121, whereby the alternate molding strips 161 constituting the set of contacts on one pair of strips 161 will establish contact with the even numbered ones of the bare wire multiples 121 and the contacts on the other pair of strips 161 will establish connection with the odd numbered ones of the bare wire multiples 121. The reed portions 162 extending forwardly from one set of base moldings 161 are straight or lie in a flat plane which corresponds to the plane of an associated one of the bare wire multiple conductors 121. The rearwardly disposed portion of the reeds 162 of the inner molding of each pair are bent over at approximately 90° to the axis of the forwardly disposed portion thereof and extends toward the corresponding reed 162 of the other molding 161 of the pair to intersect the corresponding or paired reed 162 (see Fig. *5a*). The rearwardly extending portion of the reeds 162 in the other sets of moldings 161 are bent and connected in a manner similar to the bending of the reeds illustrated in Figure 5. The utilization of paired reeds or contacts insures a constant positive contact between the reeds 162 and the bare wire multiples 121. By interconnecting the paired reeds 162 outside of the contactor zone, a single terminal is provided for each pair of contacts which connect to the bare wire multiple 121 for ready and convenient attachment of the flexible conductors or the like.

The contactor or forwardly projecting portion of the reeds 162 of the second pair of moldings 161 are approximately S-shaped in contour, the leading or forward edge of each reed being inclined from the plane of the reed to facilitate contact along a sliding plane of the associated one of the bare wire multiples 121. Immediately inward from the inclined leading edge, each reed is provided with an oppositely inclined portion to form a detent or locking portion, and a groove within which the assigned bare wire multiple 121 is received to lock the plug-in jack to the multiple. Disposition of the various portions of the S-shape is such that the multiples 121 will be forced out of their normal planes of disposition by the leading edge of the reeds 162 and retained in the new position by the detent portion of the reeds 162 to maintian a live pressure. Thus, as the jack is moved into position the spreading of the bare wire multiples 121 is effected by the entering portion of each set of reeds. As the hump portion of the leading edges of the reeds 162 pass over the respective multiples, the spreading pressure is relaxed and the bare wire multiples 121 engaged by the bent reeds 162 fall into the locking detent provided by the bent portion of those reeds. Inasmuch as each set of reeds 162 is now located in the approximate plane previously occupied by the respective bare wire multiples 121 due to the flexing of the reeds and multiples, the dimensional interference effect is accomplished and the tendency of the reeds and multiples to return to their normal positions establishes a live pressure action to insure a firm contact between the reeds and multiples.

A cover member 165 may be provided for the rearwardly extending terminals of the plug-in jack 124, the sides of the cover 165 facilitating handling of the jack and plugging in of the unit in its association with the horizontal bare wire multiples 121.

*Conclusion*

The ready detachability of the relay strips of equipment is the key to the provision of the extremely flexible system disclosed herewith. Ease of maintenance, replacement and repair are a few of the advantages which are achieved as a result of the flexible structure of the equipment, such advantages being accompanied by a corresponding reduction in installation and operating costs.

The jack ended system of connection permits the assembly of a major portion of the exchange at the factory and greatly facilitates the on-the-job installation of such type equipment, whereby the number of highly skilled technicians is substantially minimized. The structural arrangement of the equipment is such as to require a minimum of space for a given amount of equipment and lends the equipment to use even under the most unfavorable space conditions. Further, the novel cabling and structural arrangement lends itself to the use of a larger percentage of soft tin copper wire, which is more readily handled to thereby facilitate installation and maintenance problems.

Of special note are the several novel connecting means disclosed herein which render the exchange completely demountable, each unit being simple in construction, economical to manufacture, and extremely reliable in operation. The ability of each of these units to provide contact completion or interruption in an easy, rapid, operation encourages the universal use thereof. The manner in which each unit provides circuit connections, which are under heavy pressure when in the operated position, insures absolute reliability and dependability in operation.

These advantages and others set forth in the foregoing specification evidence a telephone system which is an extremely important advancement in the art.

While we have described what we regard to be a preferred embodiment of our invention, it will be apparent that variations, rearrangements, modifications and changes can be made therein without departing from the scope of the present invention as defined by the appended claims.

We claim:

1. A basic one hundred line switching bay for use in an all-relay type exchange comprising line circuit equipment, line finder switches, line hunting equipment, common connector control equipment, connector auxiliary equipment and connector switch equipment, said equipment being divided into predetermined groups, a plurality of strip members, each strip member being arranged to mount one of said groups, fastening means for effecting demountable connection of each of said strips to said bay, and connecting means comprising a jack having a pair of separable units, each unit including a plurality of banks of conductors, one unit being mounted on each strip and a corresponding unit therefor being mounted on said frame, means for interconnecting the contacts on each relay of a strip with the conductor banks of its associated strip, and means for positioning the two jack units with the conductors of the respective banks in alignment, and means for closing and locking under pressure the contacts of the banks of said two units, to thereby effect demountable connection of the equipment of a strip to other equipment in said switching bay.

2. A basic switching bay for use in an all-relay type exchange having a four section frame for supporting switching equipment comprising line circuits, line finder switches, line hunting equipment, common connector control equipment, connector auxiliary equipment and connector switches interconnected to serve one hundred subscriber lines; said connector link auxiliary equipment being mounted in one of said four sections; said line circuit equipment and common connector control equipment being mounted in a second one of said sections;

said first two sections being mounted in side by side relation on said frame said line hunting equipment and said connector equipment being mounted in a third one of said sections; and said line finder equipment being mounted in a fourth one of said sections; certain of said equipment on said third and fourth sections being mounted in coplanar relation, and said third and fourth sections being mounted below said first and second sections respectively the relays of the equipment in each one of said sections being divided into groups, strip members including fastening means for detachably mounting each of said groups to said frames, and connecting means associated with each one of said strips for effecting demountable connection of the equipment on each of said strips to the other equipment on said bay.

3. An arrangement as set forth in claim 2 in which the first one of said sections on said bay includes strip mounted selector switch equipment for adapting said basic bay for use in larger size exchanges.

4. A demountable type exchange structure having all-relay equipment for extending communication links between subscribers in the exchange including at least line said classes of equipment being divided into predetermined groups, a plurality of strip members for individually supporting each of said groups, each of the line circuit supporting strips being arranged to mount a group of line circuits for serving ten subscriber lines of the exchange, fastening means for effecting demountable connection of each of said support strips to said exchange structure, and connecting means associated with each line circuit support strip for effecting the demountable connection of its associated line circuit equipment to the assigned subscriber lines and including a jack member including a pair of separable units, each unit including a plurality of banks of conductors, one unit being mounted on the strip and the corresponding unit being mounted on the frame, means for interconnecting the contacts of the members supported on the strip to the conductor banks of the strip-mounted jack unit, and means for bringing the conductors of the respective banks of the said two units into locked engagement with mounting of the strip on the frame, to thereby effect the demountable connection of the line circuit equipment to the line finder-connector equipment supported on others of said strips.

5. A demountable type exchange structure having all-relay equipment for extending communication links between the subscribers in the exchange including at least line circuit, line finder and connector equipment, each of said classes of equipment being divided into predetermined groups, a plurality of strip members for individually supporting each of said groups demountably fastened to said structure, said line finder and connector supporting strips being mounted in side by side relation, each one thereof being arranged to support at least ten units relays and ten tens relays in tandem relation, bare wire conductor members for multipling the tens relays which are disposed in coplanar relation on each of the adjacent links, and connecting means for effecting demountable connection of said strip mounted tens and units relays said bare wire multiples and to other equipment in said exchange.

6. A demountable type exchange structure having all-relay equipment for extending communication links between the subscribers in the exchange including at least line circuit, line hunting, line finder and connector equipment for serving one hundred subscriber lines, each of said classes of equipment being divided into predetermined groups, a plurality of strip members for individually supporting each of said groups arranged for demountable connection with said exchange structure, said line finder and connector supporting strips being mounted in side-by-side relation, whereby the relays mounted on the adjacent strips are disposed in coplanar relationship, bare wire conductor members extending thereacross for effecting multiple connection of certain of said coplanar relays, and connecting means associated with each of said line finder supporting strips including a jack member having a pair of separable units, each unit including a plurality of banks of conductors, one unit being mounted on the strip and the corresponding unit being mounted on the frame, means for interconnecting the contacts of the line finder members supported on the strip to the conductor banks of the strip-mounted jack, and means for extending the contacts on the frame-mounted portion of the jack through corresponding connector link equipment in the exchange to thus effect demountable connection of its associated line finder equipment with the associated connector auxiliary equipment in the exchange, and a wedge-lock connecting member for effecting the demountable connection of said coplanar relays on said strips to said bare wire multiples.

7. A demountable type exchange structure having all-relay equipment for extending communication links between the subscribers in the exchange including at least line circuit, line finder, connector link auxiliary, connector common control and connector equipment, each of said classes of equipment being divided into predetermined groups, a plurality of strip members for individually supporting each of said groups arranged for demountable connection with said exchange structure, certain of said strips being mounted in side-by-side relation, whereby the relays mounted on the adjacent strips are disposed in coplanar relationship, bare wire conductor members extending thereacross for effecting multiple connection of said coplanar relays, and connecting means associated with each connector equipment supporting strip including a jack member having a pair of separable units, each unit including a plurality of banks of conductors, one unit being mounted on the strip and the corresponding unit being mounted on the frame, means for interconnecting the contacts of the connector relay members on said each strip to the conductor banks of the corresponding strip-mounted jack unit, and means on said frame-mounted jack unit portion for extending conductors to associated connector link equipment, and means for bringing the conductors of the respective banks of the said two units into locked engagement with the mounting of the strip to the frame to thereby effect demountable connection of its associated connector multiple equipment with the connector link auxiliary equipment in the exchange and a wedge-lock connecting member associated with each of said multiple relay strips for effecting the demountable connection of said coplanar relays on said strips to said bare wire multiples.

8. A demountable type exchange structure having all-relay equipment for extending communication links between the subscribers in the exchange, said exchange equipment being divided into predetermined groups, strip members for supporting each of said groups adapted for detachable connection to said structure, and connecting means associated with each strip for effecting demountable connection of its associated equipment to certain other equipment in said exchange, said connecting means comprising a two section jack member, each of which section comprises a plurality of banks of contacts for cooperating with each other when the associated strip is mounted to the frame, the connections from the relays mounted on the strip being connected to the banks of one of said jack sections, and the connections extending from the other equipment in the exchange to said members on said strip being connected to the banks on the other of said jack sections and an actuator means carried by one of said sections for moving the banks into operative contact under pressure and maintaining said pressure therebetween until subsequently released.

9. A demountable type exchange structure having all-relay equipment for extending communication links between subscribers in the exchange, said relay equipment being divided into predetermined groups, a plurality of strip members for individually supporting each of said groups demountably fastened to said structure, certain of said strips being mounted in side by side relation whereby the relays mounted on the adjacent strips are disposed in coplanar relationship, bare wire conductor members extending thereacross for effecting multiple connection of said coplanar relays, a first connecting means associated with each of said certain strips for effecting demountable connection of said coplanar relays to said bare wire multiples, and a second connecting means associated with said certain strips for effecting the demountable connection of said coplanar relays with said other equipment in said exchange.

10. An arrangement as set forth in claim 9 in which said first and second connecting means comprise multiple contact making members, each being effective in its circuit completing operation to lock the completed connections under pressure.

11. A demountable type exchange structure having all-relay equipment for extending communication links between the subscribers in the exchange, said equipment being divided into predetermined groups, a plurality of strip members demountably fastened to said structure for individually supporting each of said groups, certain of said supporting strips being arranged in side-by-side relation to support their associated relays in coplanar relation, wire terminal members of said relays, bare wire multiples for interconnecting the wire reed terminals of said coplanar relays on the strips which are positioned in said adjacent relation, connecting means for effecting demountable connection of said relays with said bare wire multiples comprising a two-action member which is adapted to wedge the reed terminals of the relay to said bare wire multiples and to thereafter lock the conductors in contact therewith under continued pressure, and further connecting means for connecting the strips to bare wire multiples comprising a multiple contact means for effecting locking pressure contact with the bare wire multiples and flexible cable means for connecting same to other equipment in the exchange.

12. A demountable type telephone exchange structure having all-relay equipment for extending communication links between the subscribers in the exchange, said relay equipment being divided into predetermined groups, a plurality of strip members being demountably fastened to said structure for individually supporting each of said relay groups, jack connecting means for demountably connecting the equipment on each strip to other equipment in the exchange, certain of said strips being mounted in side-by-side relation to effect the disposition of each of the relays mounted thereon in a coplanar relationship, bare wire conductor members for multipling each of the sets of coplanar relays so disposed, connecting means for effecting the demountable connection of said relay with said bare wire multiples comprising a two action member which is adapted to connect the reed terminals of the coplanar relays to said bare wire multiples and to thereafter lock same under continued pressure, and a further connecting means for connecting certain of said relays on others of said strips to said coplanar relays comprising a plug-in jack unit for effecting locking pressure contact with the bare wire multiples and attached flexible cable means for connection to the jack connecting means for the strips which support said certain relays.

13. A demountable type exchange structure having all-relay equipment for extending communication links between the subscribers in the exchange including at least line circuit, line finder and connector equipment, each of said classes of equipment being divided into predetermined groups, a plurality of strip members demountably fastened to said structure for individually supporting each of said groups, said line finder and connector equipment supporting strips being mounted in side-by-side relation to effect the disposition of each of the relays mounted thereon in a coplanar relationship, bare wire conductor members for multiplying each of the sets of coplanar relays so disposed, a two chain line-hunting relay set mounted on certain of said strip members, selection relays on each of said line finder strips mounted in coplanar relation with one another, a second series of bare wire conductor members for multipling said line finder selection relays in two separate groups and connecting means comprising a plug-in-jack for effecting locking pressure contact with the bare wire multiples and attached flexible cable means extending to said line-hunting relay set for effecting a demountable connection between the said strip-mounted hunting chains and the bare wire multiples on said line finder strips.

14. A telephone exchange having all-relay equipment for extending communication links between the subscribers in the exchange comprising a series of basic hundred line bay equipment, each of said bays including at least line circuit, line finder selector, connector equipment and common control equipment therefor, each of said classes of equipment on each bay being divided into predetermined groups, a plurality of strip members demountably fastened to each of said bays for individually supporting each of said assigned connector groups of equipment thereon, a connector selection relay mounted on each of said strips certain of said connector strips in said equipment being mounted in side-by-side relation to dispose the selection relays thereon in coplanar relation, a series of sets of bare wire conductor members for interconnecting said selection coplanar relays in separate groups for connection to said common control equipment in said individual group formations, and connecting means for effecting demountable interconnection of the connector strips to the bare wire multiples comprising wedge-lock means for effecting demountable connection of the reed terminals of said coplanar relays to said bare wire multiples, and plug and cable connecting means for connecting each of said groups of selection relays to corresponding connector control equipment comprising flexible cable terminated at one end by a multiple contact plug-in jack arrangement, said contact jack having means for effecting a locked pressure contact in its association with the bare wire multiples of the exchange.

15. In a demountable type automatic telephone exchange including a switchboard, a plurality of relay units, each relay unit including contact bearing members for controlling circuit connections, a plurality of strip members, means for mounting said relay units in given groups on said strips, means for detachably mounting each of said strips in given sections on said switchboard, at least one set of bare wire members which extend adjacent preassigned ones of said contact bearing members, and pressure exerting means operable to detachably connect said contact bearing members to said bare wire members.

16. In an automatic telephone exchange including a switchboard, relay members for controlling associated multipled and non-multipled contact members, a plurality of strip members, means for mounting said relays in given groups on said strips, two section jack means for detachably mounting each of said strips on said switchboard, one section of said jack being connected to said strip and the other section of said jack being connected to said switchboard, strip cable conductors extending between non-multiple contacts of relays on each strip and the strip-mounted section of the associated jack means, switchboard cable connected between the switchboard mounted section of predetermined ones of the jack members to interconnect the non-multipled contacts of the relays on the strips, a plurality of sets of bare wire members mounted adjacent the multipled contacts of said relays, and means for detachably connecting said multipled contacts to said bare wire members.

17. In an automatic telephone exchange including a switchboard, relay members for controlling associated multipled and non-multipled contact members, a plurality of strip members, means for mounting said relays in given groups on said strips, two-section jack means for detachably mounting each of said strips on said switchboard, one section of said jack being connected to said strip and the other section of said jack being connected to said switchboard, strip cable means for each strip connected between the non-multipled contacts of the relays thereon and the strip-mounted section of the associated jack, and switchboard cable means associated with certain strips connected at one end to the switchboard mounted section of the strip jack member, and including means for detachably connecting the other end of said switchboard cable to a corresponding set of said bare wire multiple members.

18. In an automatic telephone exchange including a switchboard, relay members for controlling associated multipled and non-multipled contact members, a plurality of strip members, means for mounting said relays in given groups on said strips, two-section jack means for detachably mounting said strip members on said switchboard, one section of said jack being connected to said strip and the other section of said jack being connected to said switchboard, strip cable members connected between non-multipled contacts of said relays on each strip and the strip mounting section of the associated jack, a plurality of switchboard cable members each of which is connected between the switchboard mounted sections of preassigned ones of said jack members, a plurality of sets of bare wire members, means for detachably connecting same to multipled contacts of said relays, and a second set of switchboard cable means each of which is connected to the switchboard mounted section of the associated jack and which includes plug in jack means at its other end for detachably connecting same to an associated set of the bare wire multiples.

References Cited in the file of this patent

UNITED STATES PATENTS

| | | |
|---|---|---|
| 1,714,611 | Merk | May 28, 1929 |
| 1,809,025 | Cruser | June 9, 1931 |
| 1,863,376 | Kessler et al. | June 14, 1936 |
| 1,874,566 | McElyea | Aug. 30, 1932 |
| 1,886,296 | Neir et al. | Nov. 1, 1932 |
| 2,027,743 | Merkel | Jan. 12, 1936 |
| 2,415,437 | McBerty | Feb. 11, 1947 |